US009454538B2

(12) United States Patent
Noronha et al.

(10) Patent No.: US 9,454,538 B2
(45) Date of Patent: *Sep. 27, 2016

(54) LOW-OVERHEAD ENHANCEMENT OF RELIABILITY OF JOURNALED FILE SYSTEM USING SOLID STATE STORAGE AND DE-DUPLICATION

(71) Applicant: International Business Machines Corporation, Armonk, NY (US)

(72) Inventors: Ranjit M. Noronha, Mumbai (IN); Ajay K. Singh, Wakad (IN)

(73) Assignee: International Business Machines Corporation, Armonk, NY (US)

( * ) Notice: Subject to any disclaimer, the term of this patent is extended or adjusted under 35 U.S.C. 154(b) by 59 days.

This patent is subject to a terminal disclaimer.

(21) Appl. No.: 14/521,582

(22) Filed: Oct. 23, 2014

(65) Prior Publication Data

US 2015/0039568 A1 Feb. 5, 2015

Related U.S. Application Data

(63) Continuation of application No. 13/535,811, filed on Jun. 28, 2012, now Pat. No. 8,880,476.

(51) Int. Cl.
*G06F 17/30* (2006.01)
*G06F 3/06* (2006.01)

(52) U.S. Cl.
CPC ....... *G06F 17/30156* (2013.01); *G06F 3/0608* (2013.01); *G06F 3/0641* (2013.01); *G06F 3/0689* (2013.01); *G06F 17/3033* (2013.01); *G06F 17/30191* (2013.01); *G06F 17/30371* (2013.01); *G06F 3/0679* (2013.01)

(58) Field of Classification Search
None
See application file for complete search history.

(56) References Cited

U.S. PATENT DOCUMENTS

| 6,470,428 B1 * | 10/2002 | Milway | G06F 12/0888 711/118 |
|---|---|---|---|
| 7,873,619 B1 | 1/2011 | Faibish et al. | |
| 8,095,577 B1 | 1/2012 | Faibish et al. | |
| 8,117,464 B1 * | 2/2012 | Kogelnik | H04L 63/0428 380/284 |
| 2011/0131390 A1 | 6/2011 | Srinivasan et al. | |
| 2011/0191522 A1 * | 8/2011 | Condict | G06F 12/123 711/103 |
| 2011/0213917 A1 | 9/2011 | Davis | |
| 2011/0225211 A1 | 9/2011 | Mukherjee et al. | |
| 2011/0276744 A1 | 11/2011 | Sengupta et al. | |

(Continued)

OTHER PUBLICATIONS

U.S. Appl. No. 13/535,811.

(Continued)

*Primary Examiner* — Anh Tai Tran
(74) *Attorney, Agent, or Firm* — Stephen R. Tkacs; Stephen J. Walder, Jr.; Randall J. Bluestone

(57) ABSTRACT

A mechanism is provided in a data processing system for reliable asynchronous solid-state device based de-duplication. Responsive to receiving a write request to write data to the file system, the mechanism sends the write request to the file system, and in parallel, computes a hash key for the write data. The mechanism looks up the hash key in a de-duplication table. The de-duplication table is stored in a memory or a solid-state storage device. Responsive to the hash key not existing in the de-duplication table, the mechanism writes the write data to a storage device, writes a journal transaction comprising the hash key, and updates the de-duplication table to reference the write data in the storage device.

10 Claims, 7 Drawing Sheets

(56) References Cited

U.S. PATENT DOCUMENTS

| | | |
|---|---|---|
| 2011/0276781 A1 | 11/2011 | Sengupta et al. |
| 2011/0320865 A1 | 12/2011 | Jain et al. |
| 2012/0017054 A1 | 1/2012 | Arai et al. |
| 2013/0238832 A1 | 9/2013 | Dronamraju et al. |

OTHER PUBLICATIONS

"ARM Accelerates data replication with New Isilon IQ 10000X-SSD", http://www.isilon.com/press-release/arm-accelerates-data-replication-new-isilon-iq-10000x-ssd, Jan. 2, 2012, 2 pages.

"NILFS Continuous Snapshotting Filesystem for Linux", NILFS http://www.nilfs.org/en/, Jan. 2, 2012, 2 pages.

"Performance of Large Journaling Filesyststems", IBM, http://publib.boulder.ibm.com/infocenter/lnxinfo/v3r0m0/index.jsp?topic=%2Fliaag%2Fjournalingfilesyste, Nov. 2007, 31 pages. m.htm.

"ZFS", Oracle ZFS. http://en.wikipedia.org/wiki/ZFS, Oct. 22, 2014, 29 pages.

Brown, Aaron et al., "Block-level Inline Data Deduplication in Ext3", University of Wisconsin-Madison Department of Computer Sciences, http://pages.cs.wisc.edu/~kosmatka/dedupfs/paper.pdf, Dec. 23, 2010, 8 pages.

Haskin, Roger, "Solid State Storage for File Systems", IBM Corporation, 2010, http://storageconference.org/2010/Presentations/MSST/19.Haskin.pdf, 16 pages.

Kirsch, Nick, "Accelerating storage operations (esp. namespace) with SSD", Isilon Systems, http://www.isilon.com/accelerating-storage-operations-esp-namespace-ssd, Jul. 26, 2010, 2 pages.

Layton, Jeffrey B., "NILFS: A File System to Make SSDs Scream", Linus Magazine, http://www.linux-mag.com/id/7345/, Jun. 2, 2009, 5 pages.

Oral, Sarp et al., "Efficient Object Storage Journaling in a Distributed Parallel Filesystem", USENIX FAST 2010, http://www.usenix.org/events/fast10/tech/full_papers/oral.pdf, 12 pages.

Piernas, Juan et al., "DualFS: A New Journaling File System without MetaData Duplication", http://www.google.co.in/url?sa=t&source=web&cd=6&ved=0CEMQFjAF&url=http%3A%2F%2Fciteseerx.ist.psu.edu%2Fviewdoc%2Fdownload%3Fdoi%3D10.1.1.3.565%26rep%3Drep1%26type%3Dpdf&rct=j&q=filesystem%20jounral%20deduplication&ei=KYONTpn3K-j9sQKryfzQAQ&usg=AFQjCNF, Jun. 22-26, 2002, 10 pages.

Prabhakakaran, Vijayan et al., "Analyses and Evolution of Journaling Filesystems", Proceedings of the USENIX 2005 Annual Technical Conference, Apr. 10-15, Anaheim, CA, http://www.usenix.org/event/usenix05/tech/general/full_papers/prabhakaran/prabhakaran_html/main.html, 16 pages.

Stack, Eric, "File System Tiers Metadata for Performance Gains Without Adding Cost", http://www.storage-switzerland.com/Blog/Entries/2010/11/22_File_System_tiers_metadata_for_performance_gains_without_adding_cost.html, Nov. 22, 2010, 3 pages.

Woods, Mark et al., "Flash Memory Technology in Enterprise Storage Flexible Choices to Optimize Performance", NetApp White Paper, http://www.itdialogue.com/wp-content/uploads/2010/04/Flash-in-Enterprise-Storage.pdf, Nov. 2008, 10 pages.

* cited by examiner

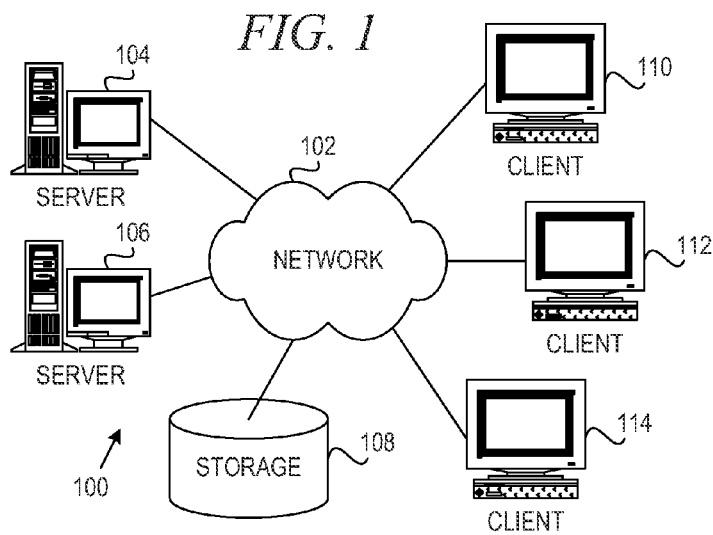

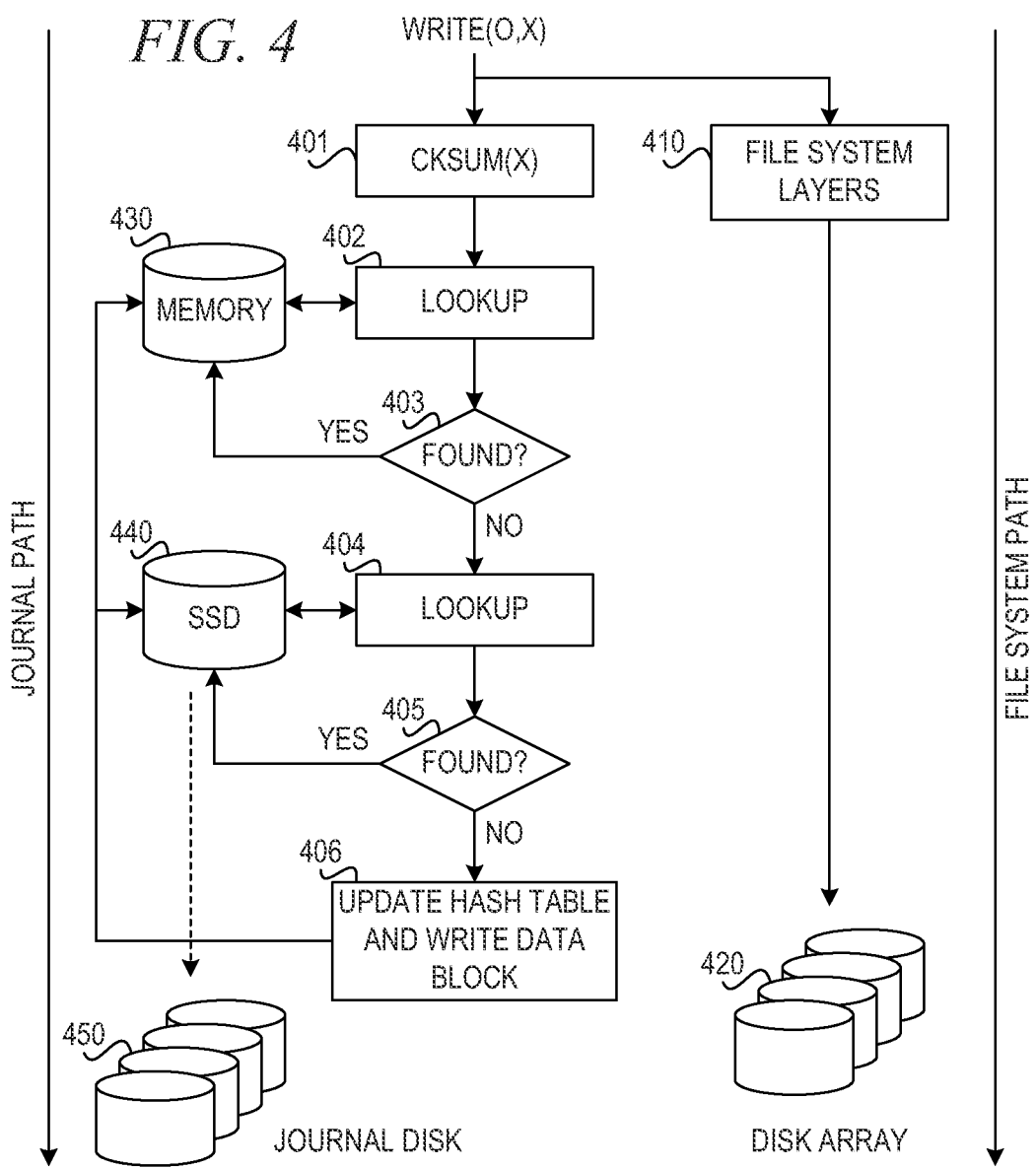

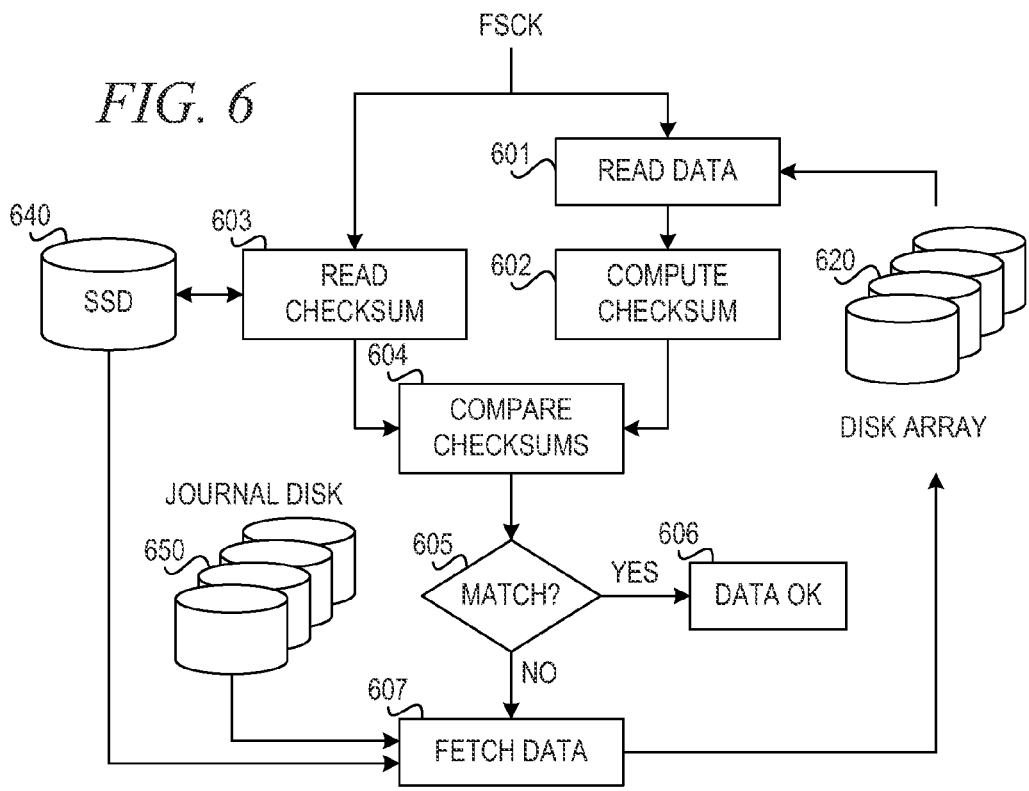
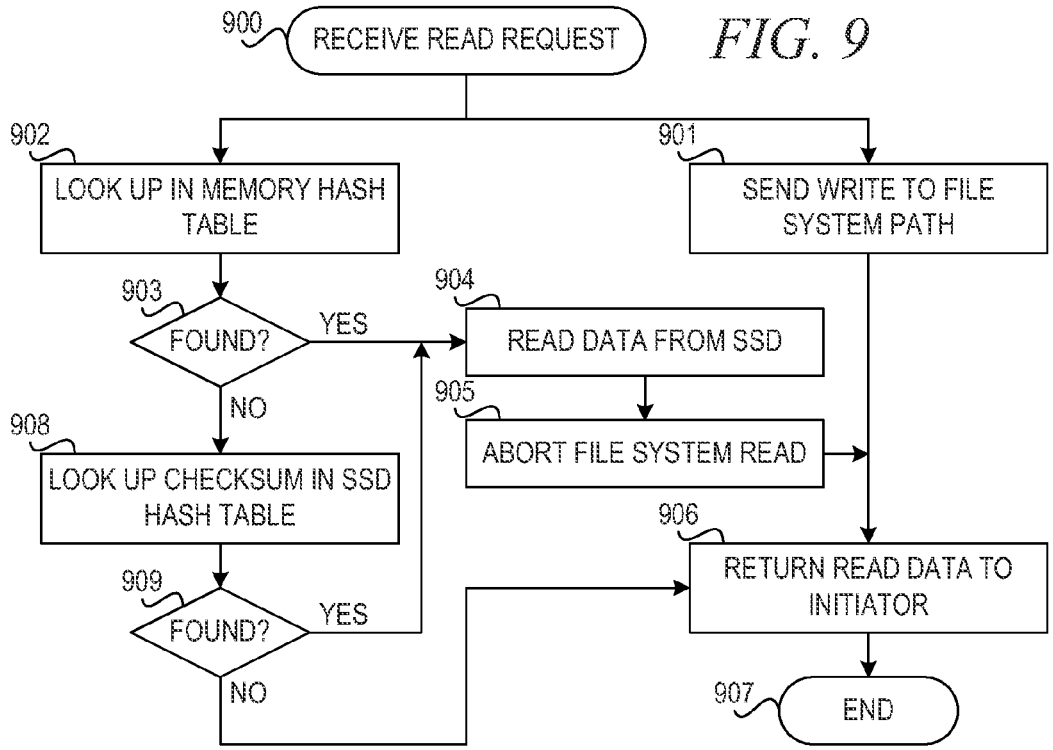

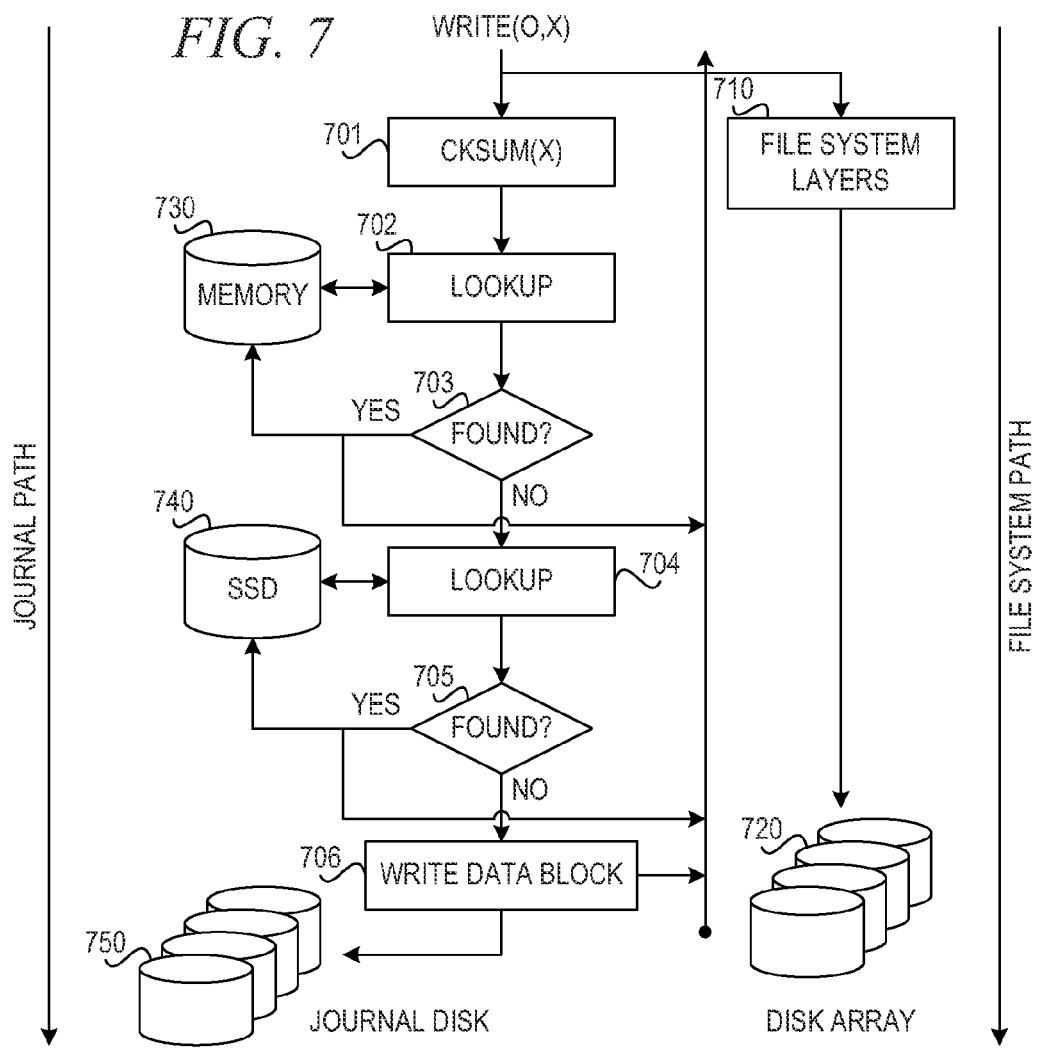

LOW-OVERHEAD ENHANCEMENT OF RELIABILITY OF JOURNALED FILE SYSTEM USING SOLID STATE STORAGE AND DE-DUPLICATION

BACKGROUND

The present application relates generally to an improved data processing apparatus and method and more specifically to mechanisms for enhancing the reliability of a journaled file system using solid state storage and data de-duplication.

File systems are typically prone to failures such as node crashes because of power outages and software bugs, among other things. During such failures, updates to the file system that were not written to the disk may be lost. This may result in leaving the file system in an inconsistent state. A simple example of this is a file that was created but whose parent directory was not updated to contain the directory entry for the file. When the file system comes back online, the file may not exist in the directory, even though its data structure, commonly called an inode, lingers in the file system. Another example is a file write that was in the file system buffers but did not reach the disk before the outage.

To deal with these types of failures, file systems typically use a mechanism called the file system consistency check (fsck). The file system consistency check typically goes through each of the files in the file system and determines if it is consistent, i.e., if the file is within the directory tree hierarchy. Depending on the architecture, the file system may also perform additional operations such as checking if the file is corrupted using a checksum or hash algorithm. This may also be extended to the block level, where each block (including the superblock) on the disk may be cross checked for consistency. The running time for fsck depends on linearly on the size of the file system (i.e., the number of files and their sizes). The file system consistency check is usually disruptive; the file system cannot be used during the consistency check. This results in loss of access to the file system during this time.

To reduce the impact of fsck, modern file systems employ a mechanism called journaling. As the name suggests, a journal is a log of transactions performed during the lifetime of the file system. A journal is essential to reduce the impact of failures, such as power outages, on outstanding uncommitted data in a file system without the overhead of fsck. The journal also allows the file system to be brought online after a crash within a short amount of time.

At a very basic level, for each transaction that modifies the file system, such as file creation, journaled file systems typically write a start marker to the journal. When the transaction completes, a commit marker is written to the journal. Depending on the reliability semantics desired, different levels of journaling are possible. Metadata journaling only commits the file system transactions with the start and commit markers to the journal. Data may also be written to the journal. This improves the reliability of journaling by allowing the file system to recover from data corruptions.

The best reliability semantics may be achieved by forcing every transaction to commit to disk before returning to the initiator. However, this comes at the cost of increased disk I/O and reduced performance. Compounding this performance problem is the issue of maintaining ordering semantics, which requires the file system to return to the initiator only after the commit marker is on disk. The performance penalty may be addressed by bunching a set of transactions together and writing the journal to disk at regular intervals. This reduces the reliability of the journal, because some transactions may not be on disk when a fault occurs. Journaling is a tradeoff between performance and the reliability semantics desired.

Solid state storage offers persistent storage across power outages. Solid state drives (SSDs) are usually based on NAND flash memory. SSDs fit somewhere between dynamic random access memory (DRAM) and disks in the cache hierarchy. SSDs usually have asymmetric access times; read operations have lower latencies than write operations. Solid state devices also have a limited number of write cycles. For some class of SSDs, the write times may be comparable to that of magnetic hard disk drives (HDDs)

De-duplication is a technique for reducing duplicate data. Data de-duplication is gaining traction in online storage systems. There are several different forms of de-duplication. In its simplest form, de-duplication works at the application level. For example, an e-mail with an attachment sent to a group will create several different copies of the same document. For internal communications within a company, this may greatly increase the quantum storage needed. An e-mail system with de-duplication would detect the multiple different copies and store only a single copy on some common server.

De-duplication may also be achieved at the level of the file system or below at the disk level. There are generally three different types of de-duplication, namely file, block, and byte. As the name suggests, file level de-duplication does a checksum or hash of the entire file. Files that have the same hash signature are assumed to have identical data and may be replaced completely with a hash signature. Block level de-duplication uses the same technique, except the granularity is a disk block. Finally, the granularity for byte level de-duplication is a window of bytes. Byte de-duplication can potentially offer the highest level of de-duplication, but is highly computationally intensive.

SUMMARY

In one illustrative embodiment, a method, in a data processing system, is provided for reliable asynchronous solid-state device based de-duplication. The method comprises responsive to receiving a write request to write data to the file system, sending the write request to the file system. The method further comprises in parallel to sending the write request to the file system, computing a hash key for the write data. The method further comprises looking up the hash key in a de-duplication table, wherein the de-duplication table is stored in a memory or a solid-state storage device. The method further comprises responsive to the hash key not existing in the de-duplication table, writing the write data to a storage device, writing a journal transaction comprising the hash key, and updating the de-duplication table to reference the write data in the storage device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 depicts a pictorial representation of an example distributed data processing system in which aspects of the illustrative embodiments may be implemented;

FIG. 2 is a block diagram of an example data processing system in which aspects of the illustrative embodiments may be implemented;

FIG. 4 is a block diagram showing a write operation in accordance with an illustrative embodiment;

FIG. 6 is a block diagram showing data restoration in accordance with an illustrative embodiment;

FIG. 7 is a block diagram showing a write operation with poor solid-state drive performance in accordance with an illustrative embodiment;

FIG. 9 is a flowchart illustrating operation of a mechanism for performing a read operation in a reliable asynchronous solid-state device based de-duplication solution in accordance with an illustrative embodiment.

DETAILED DESCRIPTION

Figure 3:
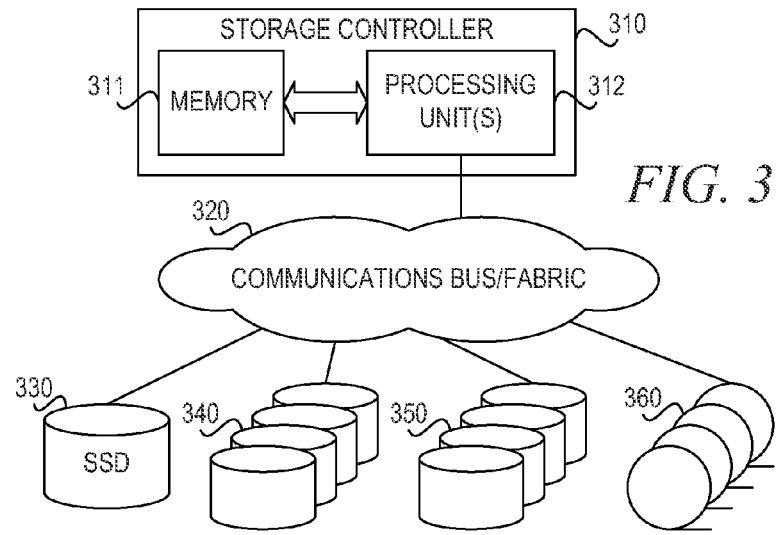
FIG. 3 depicts a pictorial representation of an example storage system in which aspects of the illustrative embodiments may be implemented.

The illustrative embodiments provide a mechanism for reliable asynchronous solid state storage based de-duplication to improve reliability of journaling with little or no overhead. The mechanism of the illustrative embodiments potentially allows the file system to recover from both metadata and data corruption and losses to the extent allowable by physical limitations. The mechanism of the illustrative embodiments combines two techniques: solid state storage and de-duplication. The mechanism of the illustrative embodiments eliminates the problem of disk drives reordering transactions and making journal operations unreliable. The mechanism of the illustrative embodiments may provide additional desirable characteristics, such as compression and enhanced I/O performance.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 or a storage system 108 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 depicts a pictorial representation of an example storage system in which aspects of the illustrative embodiments may be implemented. Storage controller 310 has one or more processing units 312 and memory 311. Instructions for the operation of storage controller 310 may be loaded into main memory 311 for execution by processing unit 312. The processes for illustrative embodiments may be performed by processing unit 312 using computer usable program code, which may be located in a memory such as, for example, memory 311.

Storage controller 310 connects to communications bus or fabric 320. Storage controller 310 may receive access requests from an initiator (not shown) via communications bus/fabric 320 or via another communications fabric or network (not shown). For write requests, storage controller 320 may write data to tiered storage, which may include hard disk drive (HDD) storage 350 and tape storage 360. Storage controller 320 also sends the write to journaling storage 340.

In accordance with an illustrative embodiment, to help reduce the impact of journal overhead and enhance reliability, a mechanism is provided to modify the filesystem journal path using reliable asynchronous solid state storage based de-duplication. Storage controller 320 receives data modifications or write I/O operations from an initiator or application and sends them in parallel to the journal and the file system. While the data I/O is being written to the file system, the mechanism in the journal path computes a hash or checksum of the data block. A hash function is an algorithm or subroutine that maps large data sets of variable length, called keys, to smaller data sets of a fixed length. The values returned by a hash function are called hash values, hash codes, hash sums, checksums, or simply hashes. Examples of hash functions include SHA-1 and MD5 Message-Digest Algorithm.

The storage controller 320 keeps a hash table in memory 311, solid-state drive (SSD) 330, or in both memory 311 and SSD 330. The mechanism performs a lookup of the hash value in the table. If there is a hit in either the in-memory table or in the SSD, the mechanism stores the hash value in the journal transaction in SSD 330 rather than storing the actual data block.

If the hash value is not present in the in-memory table or the SSD, the mechanism writes a hash value mapping to a separate portion of SSD 330. The mechanism designates SSD 330 to contain this mapping. When this completes, the mechanism appends the hash value to the SSD tables. The mechanism also sends the hash value to the file system journal transaction on SSD 330. The mechanism may also update the in-memory table, depending on the implementation.

In one example embodiment, for SSDs that have write latencies comparable to hard disk drive latencies, the mechanism may not expect any performance gain for writing the data block to SSD 330 on a lookup miss. In that case, the mechanism may send the data block and hash key mapping directly to journal storage 340. Once the mapping completes, the mechanism returns to the application to complete the write operation. In the background, the mechanism may update SSD 330 with the entire table mapping. This has the advantage of condensing several different writes into one large write. The mechanism may achieve better bandwidth using this technique.

The mechanism of the illustrative embodiment adds a small overhead in terms of computing the hash value plus the overhead needed for lookup in the common path. There is an additional I/O operation of writing the data to the separate disk or specially designated area of the common disk in the worst case. This additional I/O operation is in the critical path for the operation. The impact of the additional I/O operation to the separate disk in the worst case may be alleviated by using SSD 330 as a write-behind cache. The expected reduction in time is considerable if the hash value of the block is already present in the in-memory table or the SSD 330, and its hash value is written in-place to the journal transaction log on the SSD. The latency is expected to be bounded by the time needed to access SSD 330 and write a small transaction block to the journal on SSD 330. Additional benefits include better potential performance for reads and compression of data in the file system.

Storing duplicate blocks to the journal as well as the file system is redundant and has an impact on performance. On the other hand, when data on disk gets corrupted, restoring the data from the journal is fast, effective, and enhances reliability. However, this puts a greater strain on the file system in the normal I/O path. The mechanisms of the illustrative embodiments attempt to reduce this overhead by storing a hash key instead of the full data block in the journal path.

To understand the concepts of the illustrative embodiments, consider the following terms:

Write(o, x)—writes x bytes of data at offset o to the file system.

Read(o, x)—reads x bytes of data at offset o from the file system.

Cksum(d)—performs a checksum or hash function on data d, where d is a data block. The size of the data block may be assumed to be the file system data block size.

Journal over block disk—a separate disk to store the hash value and data mapping, also referred to as the journal disk.

FIG. 4 is a block diagram showing a write operation in accordance with an illustrative embodiment. As shown in FIG. 4, an application requests a write operation, write(o, x). The mechanism of the illustrative embodiment splits the write operation into two parallel paths, the file system path and the journal path. In the file system path, the mechanism sends the write operation to file system layers 410 to write the data to disk array 420.

In the journal path, the mechanism uses checksum function, cksum(x) 401, to create a checksum or hash value of the data to generate a key. The mechanism uses the key in lookup function 402 to determine whether the key exists in a de-duplication table in memory 430. The de-duplication table maps keys to data blocks written to the journal. If a key exists in the de-duplication table in memory 430, then the data block exists in the journal, and there is no need to store the same data block to the journal. The in-memory de-duplication table maps hot data hits, which are stored in memory 430 for faster access on reads.

If the mechanism finds a match in the in-memory de-duplication table using lookup function 402 (YES: block 403), the mechanism updates the de-duplication table in memory 430 to map the data block to the previously written data block. If the mechanism does not find a match in the in-memory de-duplication table using lookup function 402 (NO: block 403), the mechanism uses lookup function 404 to determine whether the key exists in a de-duplication table in solid-state drive (SSD) 440. The de-duplication table in SSD 440 maps keys to data blocks written to the journal.

If the mechanism finds a match in the de-duplication table using lookup function 404 (YES: block 405), the mechanism updates the de-duplication table in SSD 440 to map the data block to the previously written data block. If the mechanism does not find a match in the de-duplication table using lookup function 404 (NO: block 405), the mechanism updates the SSD 440 with the hash key match and sends the hash key and data block to a separate disk (e.g., disk array 420) or a specially designated area of the separate disk (block 406). When the write completes, the mechanism sends the hash value to the journal transaction for the write. This completes the write journal transaction, and the mechanism may return back to the application, even though the original write to the file system path may still be in progress.

If there is a miss to the in-memory de-duplication table and the SSD de-duplication table, the mechanism must update the journal disk. This is in the critical path and must complete before returning to the application. The application write operation sees a disk write latency, which results in degraded performance. In one example embodiment, the mechanism may be enhanced to avoid this latency. When the mechanism experiences a miss in the in-memory de-duplication table and the SSD de-duplication table, the mechanism may write the hash key and data block to the SSD 440 itself. This avoids the disk latency on a miss. At some point, the SSD 440 will overflow, because of this additional mapping. The entire mapping between the hash key and the data block may be moved from SSD 440 to journal disk 450. Because this will result in a single contiguous write of the entire set of hash key/data block mappings, the mechanism will experience good performance.

The mechanism of the illustrative embodiment provides a high form of reliability when an additional journal disk 450 is employed. This is to avoid the scenario of group corruptions in the original disk impacting the data in the journal. This design helps to eliminate the ordering issue, i.e., metadata writes (and journal block writes) must be committed first to the journal before the actual file system metadata and writes are committed. However, this may be tricky to achieve with a single disk, primarily because of the on-disk cache that sometimes offers arbitrary semantics for ordering. In some cases, the on-disk cache may not honor ordering or flushing semantics. Most disk drives use the elevator algorithm, which forces them to perform writes in the order in which the disk arm spins, which could be at odds with the actual ordering requested for the writes.

An incoming write operation may experience a miss in both the in-memory de-duplication table and the SSD de-duplication table. This presents a choice of updating both the in-memory table and the SSD table or only the SSD table. This is a choice that the file system designer must make. The in-memory de-duplication table offers the lowest latency for hit times. The most frequently used hash values may be stored in the in-memory de-duplication table. This often depends not only on the locality characteristics of the application, but also on the general use of the file system. For example, if the file system is used as a back-end for a database, certain records that are stored in blocks (e.g., database descriptor records) may have a high hit ratio, but not necessarily good spatial locality within an application lifetime. The in-memory table occupancy and replacement algorithms should be decided based on the application characteristics. One possibility is to have a count of the hit rates with each hash key entry on the SSD. Those entries with the highest hit ratios potentially may be migrated to the in-memory table. Another alternative is to apply several different alternatives and have an application programming interface (API) to allow the administrator to dynamically decide on the alternative to employ, depending on the usage case.

Figure 5:
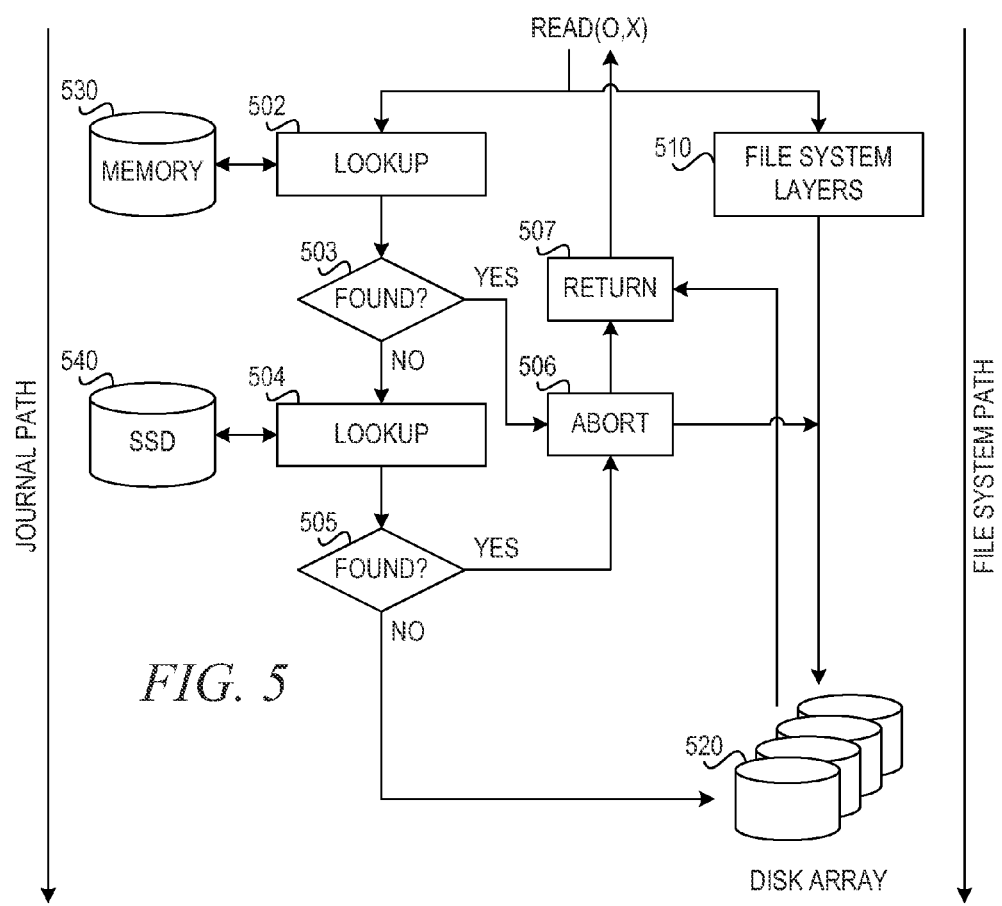
FIG. 5 is a block diagram showing a read operation in accordance with an illustrative embodiment.

FIG. 5 is a block diagram showing a read operation in accordance with an illustrative embodiment. The mechanism may be used as an optimized cache for incoming reads. The mechanism receives a read operation, read(o, x), from an application. The mechanism sends the read operation in parallel to the journal path and the file system path. In the file system path, the mechanism sends the read operation to file system layers 510 to read the data from disk array 520.

In the journal path, the mechanism uses lookup function 502 to look up the hash key in a de-duplication table in memory 530 to determine whether the read data (file, offset, size) is present in the SSD 540. If the data is present in the SSD (YES: block 503), the mechanism aborts (block 506) the file system read and returns (block 507) the data from SSD 540.

If the lookup in the in-memory de-duplication table does not result in a hit (NO: block 503), the mechanism uses lookup function 504 to look up the hash key in the de-duplication table in SSD 540 to determine whether the read data (file, offset, size) is present in SSD 540. If the data is present in the SSD (YES: block 505), the mechanism aborts (block 506) the file system read and returns (block 507) the data from SSD 540.

Even if the file system read operation cannot be aborted, it is harmless to return the read data twice, because a read operation does not modify the file system state. If the read data is not found in the SSD 540 (NO: block 503 and block 505), the journal path does not return read data. There is no need to look in the journal disk, because it is expected the read will be satisfied by the file system layers 510, which typically will be faster than looking the read data up in the journal disk.

FIG. 6 is a block diagram showing data restoration in accordance with an illustrative embodiment. The file system is generally recovered after an unclean unmounts, a crash, or a corruption is detected in the file system, for example. In these cases, a process called the file system consistency check, fsck, may be run. There generally are two different forms of doing fsck, namely offline fsck (the file system is unavailable for the period that fsck is running) and online fsck (the file system repairs the corruption while the file system is live). The mechanism for trying to correct the fault in the illustrative embodiment is the same in both cases. FIG. 6 illustrates the process for offline fsck for the sake of brevity and to simplify the description.

The mechanism receives a file system consistency check request, fsck. Starting from the first transaction in the journal, the mechanism determines whether each transaction is consistent with what is present in disk array 620. The mechanism goes through the journal and attempts to replay the transactions up to the point where the fault occurred.

The mechanism reads data corresponding to a given journal transaction (block 601) from disk array 620 and computes a checksum for the data (block 602). The mechanism also reads a checksum (hash key) for the journal transaction from SSD 640 or journal disk 650 (block 603). The mechanism then compares the checksums (block 604) and determines whether the checksums match (block 605). If the checksums match in block 605, the data is ok (block 606).

If the checksums do not match in block 605, the mechanism fetches the data (block 607) corresponding to the transaction from SSD 640 or journal disk 650. Besides the metadata, the mechanism has the data available either in the SSD 640 journal, where it may have resided temporarily, or in the journal disk 650. The mechanism then restores the data from SSD 640 or journal disk 650 and moves the data to disk array 620. This may greatly enhance the reliability of the file system, because the mechanism has the metadata along with the data that must be replicated. Because of the combined techniques of storing hash keys and the use of SSDs, the mechanism greatly reduces the impact of restoring data while the file system is in operation.

FIG. 7 is a block diagram showing a write operation with poor solid-state drive performance in accordance with an illustrative embodiment. As shown in FIG. 7, an application requests a write operation, write(o, x). The mechanism of the illustrative embodiment splits the write operation into two parallel paths, the file system path and the journal path. In the file system path, the mechanism sends the write operation to file system layers 710 to write the data to disk array 720.

In the journal path, the mechanism uses checksum function, cksum(x) 701, to create a checksum or hash value of the data to generate a key. The mechanism uses the key in lookup function 702 to determine whether the key exists in a de-duplication table in memory 730. If the mechanism finds a match in the in-memory de-duplication table using lookup function 702 (YES: block 703), the mechanism updates the de-duplication table in memory 730 to map the data block to the previously written data block. If the mechanism does not find a match in the in-memory de-duplication table using lookup function 702 (NO: block 703), the mechanism uses lookup function 704 to determine whether the key exists in a de-duplication table in solid-state drive (SSD) 740. The de-duplication table in SSD 740 maps keys to data blocks written to the journal.

If the mechanism finds a match in the de-duplication table using lookup function 704 (YES: block 705), the mechanism updates the de-duplication table in SSD 740 to map the data block to the previously written data block. If the mechanism does not find a match in the de-duplication table using lookup function 704 (NO: block 705), the mechanism updates the SSD 740 with the hash key match. The mechanism then sends the hash key and data block to a separate disk (e.g., disk array 720) or a specially designated area of the separate disk. When the write completes, the mechanism sends the hash value to the journal transaction for the write. This completes the write journal transaction, and the mechanism may return back to the application, even though the original write to the file system path may still be in progress.

If there is a miss to the in-memory de-duplication table and the SSD de-duplication table, the mechanism must update the journal disk. Some SSDs exhibit poor write performance. The write latencies for these SSDs are comparable to a hard disk write. SSDs also have limited write cycles. In accordance with one illustrative embodiment, the mechanism is modified to account for these differences and to optimize SSD life. For a write that misses in the in-memory de-duplication table and the SSD de-duplication table (NO: block 703 and block 705), the mechanism writes the data block and the checksum of the data to the journal disk 750 (block 706). The mechanism does not write the data block and checksum of the data to SSD 740 at this time. Rather, an asynchronous daemon process updates SSD 740 with the hash values in bulk. This reduces the number of writes to the SSD 740, thus increasing its lifetime. Higher bandwidth is also possible, because of the aggregate operation. The flipside is that writes with high temporal locality may not hit in the SSD. This limitation may be alleviated by updating the in-memory de-duplication table.

The mechanism may return to the application responsive to the hash key being found in memory 730, responsive to the hash key being found in SSD 740, responsive to completing the write to journal disk 750 or responsive to the write completing in disk array 720.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 8:
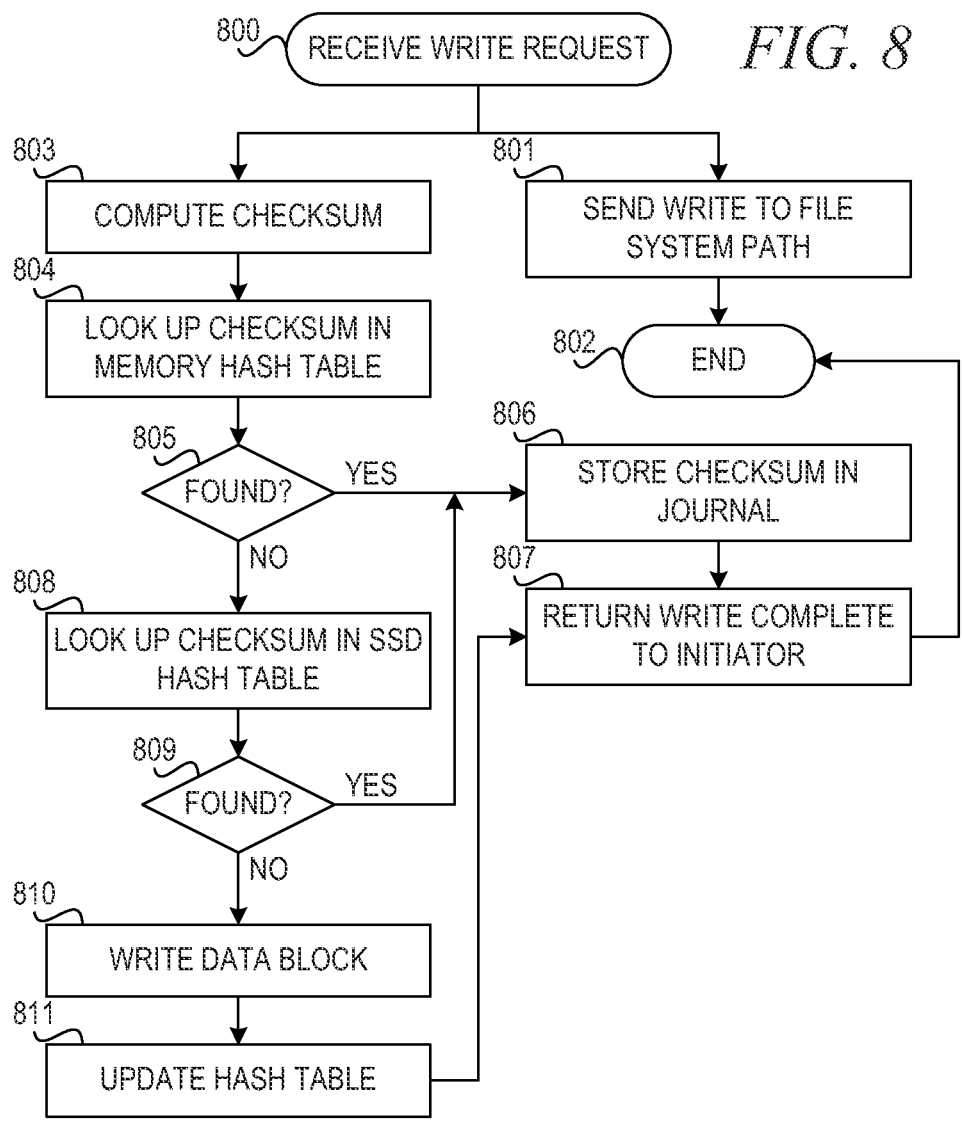
FIG. 8 is a flowchart illustrating operation of a mechanism for performing a write operation in a reliable asynchronous solid-state device based de-duplication solution in accordance with an illustrative embodiment.

FIG. 8 is a flowchart illustrating operation of a mechanism for performing a write operation in a reliable asynchronous solid-state device based de-duplication solution in accordance with an illustrative embodiment. Operation begins responsive to receiving a write request from an initiator (block 800). The mechanism sends the write operation to the file system path (block 801) and operation ends (block 802).

In parallel with sending the write to the file system path in block 801, the mechanism computes a checksum for the write data (block 803) and looks up the checksum in an in-memory de-duplication hash table (block 804). The mechanism determines whether the checksum is found in the in-memory table (block 805). If the checksum (hash key) is found in the in-table memory, the mechanism stores the checksum in the journal (block 806) and returns the write complete to the initiator (block 807). Thereafter, operation ends in block 802.

If the checksum is not found in the in-memory table in block 805, the mechanism looks up the checksum in the SSD de-duplication hash table (block 808). The mechanism determines whether the checksum is found in the SSD table (block 809). If the checksum is found in the SSD table, the mechanism stores the checksum in the journal (block 806) and returns the write complete to the initiator (block 807). Thereafter, operation ends in block 802.

If the checksum is not found in the de-duplication table in block 809, the mechanism writes the data block to disk (block 810) and updates the hash table to map the checksum to the data block on disk (block 811). Then, the mechanism returns a write complete to the initiator (block 807). Thereafter, operation ends in block 802.

FIG. 9 is a flowchart illustrating operation of a mechanism for performing a read operation in a reliable asynchronous solid-state device based de-duplication solution in accordance with an illustrative embodiment. Operation begins responsive to receiving a read request from an initiator (block 900). The mechanism sends the read operation to the file system path (block 901). In parallel with sending the read operation to the file system, the mechanism performs a lookup to determine whether the read data is mapped in the in-memory de-duplication hash table (block 902). The mechanism determines whether the read data is found in the in-memory table (block 903). If the read data is found in block 903, the mechanism reads the data from the SSD (block 904) and aborts the file system read, if possible (block 905). Thereafter, the mechanism returns the read data to the initiator (block 906), and operation ends (block 907).

If the read data is not found in block 903, the mechanism performs a lookup to determine whether the read data is mapped in the SSD de-duplication hash table (block 908). The mechanism determines whether the read data is found in the SSD de-duplication table (block 909). If the read data is found in block 909, the mechanism reads the data from the SSD (block 904) and aborts the file system read, if possible (block 905). Thereafter, the mechanism returns the read data to the initiator (block 906), and operation ends (block 907).

If the read data is not found in block 909, the mechanism returns the read data from the file system path (block 906). Thereafter, operation ends (block 907).

Figure 10:
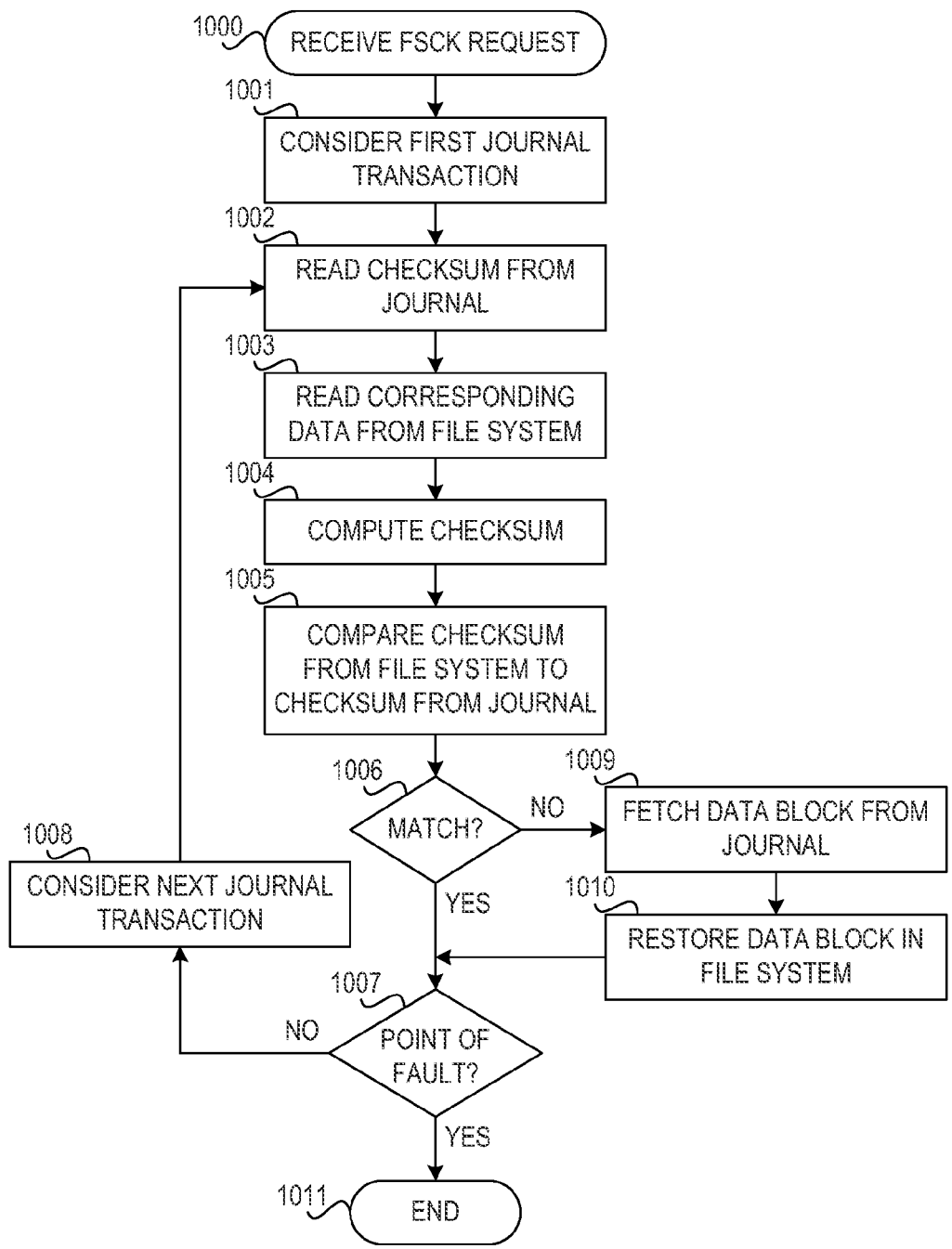
FIG. 10 is a flowchart illustrating operation of a mechanism for performing a recovery operation in a reliable asynchronous solid-state device based de-duplication solution in accordance with an illustrative embodiment.

FIG. 10 is a flowchart illustrating operation of a mechanism for performing a recovery operation in a reliable asynchronous solid-state device based de-duplication solution in accordance with an illustrative embodiment. Operation begins responsive to receiving a file system consistency check, fsck, operation from an initiator (block 1000). The mechanism considers the first journal transaction (block 1001). The mechanism reads the checksum for the journal transaction from the journal (block 1002). The mechanism reads the corresponding data from the file system (block 1003) and computes a checksum for the data (block 1004).

The mechanism then compares the checksum from the file system data to the checksum from the journal transaction (block 1005). The mechanism determines whether the comparison results in a match (block 1006). If the checksums match, the mechanism determines whether the point of fault has been reached in the journal transactions (block 1007). If the point of fault has not been reached, the mechanism considers the next journal transaction (block 1008), and operation returns to block 1002 to read the checksum for the journal transaction from the journal.

If the mechanisms do not match in block 1006, the mechanism fetches the data block from the journal (block 1009). The data block may be available in the SSD or in the journal disk. The mechanism restores the data block in the file system using the data block retrieved from the SSD or the journal disk (block 1010). Then, the mechanism determines whether the point of fault has been reached in the journal transactions (block 1007). If the point of fault has not been reached, the mechanism considers the next journal transaction (block 1008), and operation returns to block 1002 to read the checksum for the journal transaction from the journal.

If the point of fault is reached in the journal transactions in block 1007, operation ends (block 1011).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for reliable asynchronous solid state storage based de-duplication to improve reliability of journaling with little or no overhead. The mechanisms of the illustrative embodiments potentially allow the file system to recover from both metadata and data corruption and losses to the extent allowable by physical limitations. The mechanisms of the illustrative embodiments combine two techniques: solid state storage and de-duplication. The mechanisms of the illustrative embodiments may provide additional desirable characteristics, such as compression and enhanced I/O performance.

The mechanisms of the illustrative embodiments have three different scenarios. If there is a hit in the memory de-duplication table, the mechanisms result in a response time proportional to the memory latency plus the time to write the journal transaction and hash key to the SSD. Note that for the time for the journal write to the SSD is constant for all three scenarios. If there is a miss in the memory de-duplication table and a hit in the SSD de-duplication table, the response time is bound by the read time of the SSD. If the mechanism miss in the in-memory de-duplication table and the SSD table, the response time is bound by the SSD write time.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for reliable asynchronous solid-state device based de-duplication, the method comprising:
   responsive to receiving a write request to write data to the file system, sending the write request to the file system;
   in parallel to sending the write request to the file system, computing a hash key for the write data;
   looking up the hash key in a de-duplication table, wherein the de-duplication table is stored in a memory or a solid-state storage device;
   responsive to the hash key not existing in the de-duplication table, writing the write data to a storage device, writing a journal transaction comprising the hash key, and updating the de-duplication table to reference the write data in the storage device; and
   responsive to receiving a file s stem consistency check request for each given journal transaction from a first journal transaction of fault;
      reading data corresponding to the given journal transaction from the file system;
      computing a file system hash key for the data read from the file system;
      reading a journal hash key from the given journal entry;
      comparing the file system hash key and the journal hash key; and
      responsive to the file system hash key not matching the journal hash key, restoring the data from the journal to the file system.

2. The method of claim 1, wherein restoring the data from the journal to the file system comprises:
   fetching the data from the solid-state storage device and writing the data to the file system.

3. The method of claim 1, further comprising:
   responsive to the hash key existing in the de-duplication table, storing the hash key in a journal transaction for the write request.

4. The method of claim 3, wherein storing the hash key in a journal transaction for the write request comprises storing the journal transaction in the solid-state storage device.

5. A method, in a data processing system, for reliable asynchronous solid-state device based de-duplication, the method comprising:
   responsive to receiving a read request from an initiator, sending the read request to the file system, wherein the file system performs a file system read;
   in parallel to sending the read request to the file system, determining whether the read corresponds to an entry in a de-duplication table;
   responsive to the read corresponding to an entry in the de-duplication table, reading the read data from the solid-state storage device and returning the read data to the initiator; and
   responsive to receiving a file system consistency check request, for each given journal transaction from a first journal transaction to a point of fault;
      reading data corresponding to the given journal transaction from the file system;
      computing a file system hash key for the data read from the file system;
      reading a journal hash key from the given journal entry;
      comparing the file system hash key and the journal hash key; and
   responsive the file system hash key not matching the journal hash key, restoring the data from the journal to the file system.

6. The method of claim 5, further comprising:
   responsive to returning the read data from the solid-state storage device to the initiator, aborting the file system read.

7. The method of claim 5, wherein restoring the data from the journal to the file system comprises:
   fetching the data from the solid-state storage device and writing the data to the file system.

8. The method of claim 5, further comprising:
   responsive to receiving a write request to write data to the file system, sending the write request to the file system;
   in parallel to sending the write request to the file system, computing a hash key for the write data;
   looking up the hash key in a de-duplication table, wherein the de-duplication table is stored in a memory or a solid-state storage device; and
   responsive to the hash key existing in the de-duplication table, storing the hash key in a journal transaction for the write request.

9. The method of claim 8, wherein storing the hash key in the journal transaction for the write request comprises storing the journal transaction in the solid-state storage device.

10. The method of claim 9, further comprising:
   responsive to the hash key not existing in the de-duplication table, writing the write data to a storage device, writing a journal transaction comprising the hash key, and updating the de-duplication table to reference the write data in the storage device.

* * * * *